US007357437B2

(12) United States Patent
Kuhr

(10) Patent No.: US 7,357,437 B2
(45) Date of Patent: Apr. 15, 2008

(54) VEHICLE TRUNK LID OPENING DEVICE

(75) Inventor: Jürgen Kuhr, Osnabrück (DE)

(73) Assignee: Wilhelm Karmann GmbH, Osnabrueck (DE)

( * ) Notice: Subject to any disclaimer, the term of this patent is extended or adjusted under 35 U.S.C. 154(b) by 0 days.

(21) Appl. No.: 10/558,850

(22) PCT Filed: May 25, 2004

(86) PCT No.: PCT/DE2004/001085

§ 371 (c)(1), (2), (4) Date: Aug. 23, 2006

(87) PCT Pub. No.: WO2004/108457

PCT Pub. Date: Dec. 16, 2004

(65) Prior Publication Data

US 2007/0029833 A1 Feb. 8, 2007

(30) Foreign Application Priority Data

May 30, 2003 (DE) ................................ 103 24 757

(51) Int. Cl.
*B60J 7/20* (2006.01)

(52) U.S. Cl. .................................... 296/76; 296/107.08

(58) Field of Classification Search .................. 296/76, 296/107.08, 136.05

See application file for complete search history.

(56) References Cited

U.S. PATENT DOCUMENTS

| | | | |
|---|---|---|---|
| 5,823,606 A | 10/1998 | Schenk et al. | |
| 6,250,707 B1 | 6/2001 | Dintner et al. | |
| 7,004,529 B2 * | 2/2006 | Guillez et al. | ................ 296/76 |
| 2002/0109372 A1 | 8/2002 | Weissmeuller | |
| 2003/0025350 A1 | 2/2003 | Sande | |

FOREIGN PATENT DOCUMENTS

| | | |
|---|---|---|
| DE | 44 45 944 C | 4/1996 |
| DE | 199 32 501 A | 3/2001 |

* cited by examiner

*Primary Examiner*—Dennis H. Pedder
(74) *Attorney, Agent, or Firm*—Michael Best & Friedrich LLP

(57) ABSTRACT

A device for selectively moving a rear vehicle trunk lid (30) from a closed position into a forwardly-inclined intake position and into a rearwardly-inclined loading position comprises at least one support lever that is pivotable about an axis stationary relative to the vehicle. In its closed position, a rear edge of the rear trunk lid is in hinged connection with the support lever (12). A catch component (20) is arranged on the support lever (12) in front of and above the hinge connection (18, 46) for engagement with another catch component (48) that is provided on the rear trunk lid. The front wall of the rear trunk lid is connected with the vehicle via a hinge (40) that is rearwardly slidable out of a slotted link (44) that is stationary relative to the vehicle.

19 Claims, 7 Drawing Sheets

52
46
56
48
12
18
20
30
22
42
44

46
48
52
20
28
12
30
18
22
56

42
36
54
44

VEHICLE TRUNK LID OPENING DEVICE

CROSS-REFERENCE

This application is the US national stage filing of International Application No. PCT/DE2004/01085, which claims priority to German patent application no. 103 24 757.2.

TECHNICAL FIELD

The invention pertains to a device for selective movement of a rear trunk lid of a vehicle from a closed position into a forwardly-inclined intake position for opening up an intake opening in its forward area and into a rearwardly-inclined leading position for opening up a loading opening. A manual- or automatically-opening convertible top can be stowed underneath a the rear trunk lid.

BACKGROUND OF THE INVENTION

A device of this type is known from DE 101 35 581 A1. This device includes an auxiliary frame under the rear trunk lid on each vehicle side, which frame includes a first lever supported under the rear trunk lid approximately in the middle of the vehicle rear portion, which lever points forwardly in the vehicle direction when the rear trunk lid is closed; another lever is supported on its free end, which lever is actuatable by a hydraulic cylinder. The rear trunk lid is pivotably attached to the first lever via a four-link hinge.

A mechanism for a pivotable rear trunk lid, which is arranged on a vehicle, is known from DE 199 32 501 C2, which is alternatively pivotable as a trunk cover about a fore pivot axis arranged near its forward edge or as a convertible top storage lid about a rear pivot axis near its rear edge, wherein the fore pivot axis is formed by a fore four-link mechanism and the rear pivot axis is formed by a rear four-link mechanism, which two four-link mechanisms include a common lever and the respectively inactive four-link mechanism is decoupled by relative pivoting of the rear trunk lid.

A convertible vehicle having a top that is storable under a rear trunk lid is described in DE 100 38 530 A1, wherein the rear trunk lid is pivotable about a chassis-supported latch part on the rear edge of the rear trunk lid for opening up of an intake opening for the top; the rear trunk lid is pivotable into its loading position upon detaching of the hinged connection, which takes place via the latch and serves for pivoting into the intake position, for opening up of a loading opening for the trunk space. Two hydraulic- or gas pressure-cylinders are provided for guiding the rear trunk lid, which cylinders are arranged at an angle to each other and extend or retract in one or the other opposite direction, respectively, by pivoting of the rear trunk lid.

SUMMARY OF THE INVENTION

The object of the invention is to provide a simply constructed device for the selective movement of a rear trunk lid from a closed position into a forwardly-inclined intake opening and into a rearwardly-inclined loading position.

This object is solved by a device comprising at least one support lever on one vehicle side and underneath the rear trunk lid, which support lever is pivotable about a pivot axis that is stationary relative to the vehicle and extends in the traverse direction of the vehicle. The support lever is pivotable for moving the rear trunk lid from the closed position into the intake position and, in the intake position of the rear trunk lid, forms its sole support. In the vicinity of its rear edge, the rear trunk lid is. in its closed position, in hinged connection with a portion of the support lever above its pivot axis. A first catch component for engagement with another support component is provided on an upper end region of the support lever, which is disposed on the rear trunk lid rearward of the first catch component with reference to the vehicle direction. The forward edge of the rear trunk lid, in its closed position, is connected with the vehicle via at least one hinge. Further, the rear trunk lid is pivotable about the axis of the hinge from its closed position into its loading position when the hinged connection with the support lever is released, and the rear trunk lid is movable from its closed position into its intake position, in which the support lever is pivoted by maintenance of the hinged connection in a position, in which position the catch components come into mutual enuagement, and the connection of the rear trunk lid with the vehicle via the at least one hinge is released by rearward movement of the rear trunk lid, and then is further pivoted by lifting the forward edge of the rear trunk lid.

The dependent claims are directed to advantageous embodiments and further developments of the inventive device.

The simple, cost-effective-to-build, inventive device, which makes possible the storage of a foldable top or a hard top of a convertible vehicle under the rear trunk lid, is producible in a cost-effective manner as a module assembly, which is easily installable in a vehicle provided therefor.

In the following description, the invention will be explained in further detail using examples with the assistance of schematic drawings.

DETAILED DESCRIPTION OF THE INVENTION

Figure 1:
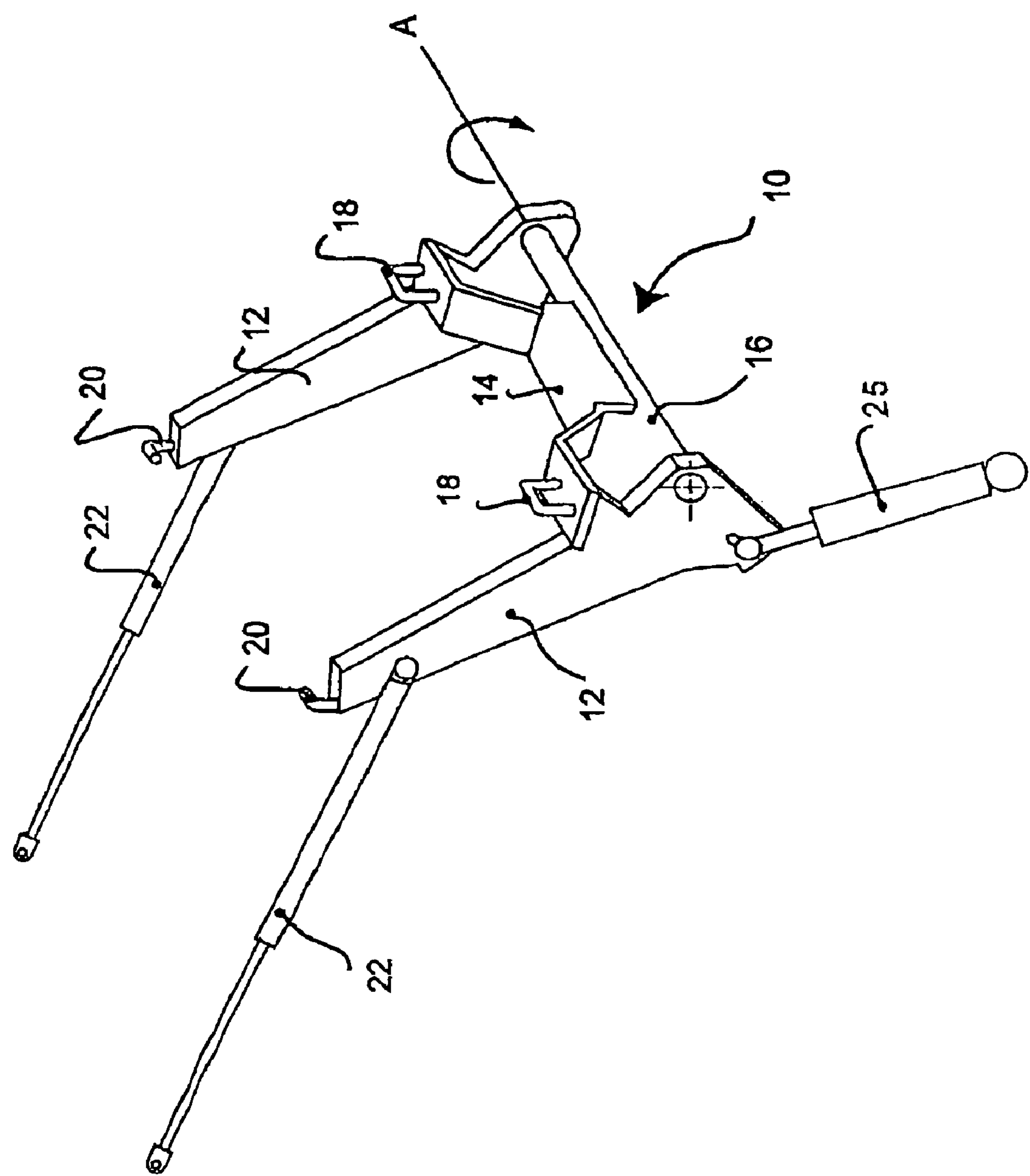
FIG. 1 a perspective view of a first embodiment of the inventive device.

According to FIG. 1, a frame assembly, which as a whole is designated by reference number 10, includes two lateral support levers 12, which are rigidly connected via a bridge component 14 to an overall U-shaped assembly. As viewed in FIG. 1, the lower, right end portions of each support lever 12 are rigidly connected via a shaft 16, which is suitable for use in a suspension (not illustrated in FIG. 1), e.g., in the area of the rear main chassis beam of a vehicle body, so that the assembly, as a whole, is pivotable about axis A of the shaft 16. As viewed in FIG. 1, closing brackets 18 are disposed on each support lever and/or bridge component above left of the axis A, wherein exceptional stability is achieved in the illustrated embodiment, in which the bridge component 14 is formed as a sheet metal component having multiple bends; the sheet metal component forms platforms under the closing brackets 18 for their attachment. Each support lever 12 includes a catch bracket and/or catch hook 20 on its upper end. An elastically-yielding element, e.g. a gas pressure damper 22, is attached to each support lever 12 underneath the catch hook 20. A hydraulic cylinder 25 is attached at the lower portion of at least one of the support levers, towards the left side and underneath the pivot axis A according to FIG. 1.

Figure 2:
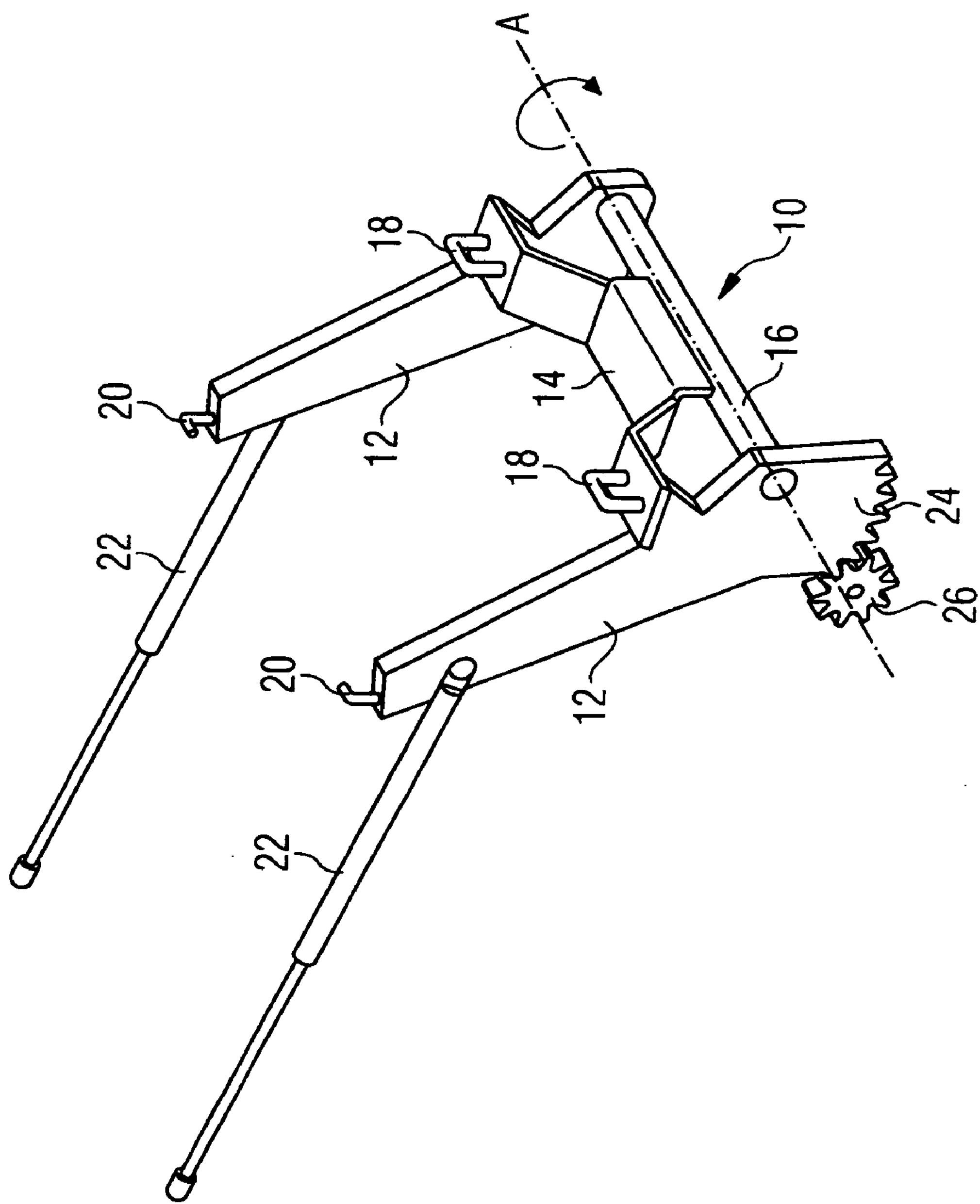
FIG. 2 a perspective view of a second embodiment of the inventive device with a modified drive device.

The arrangement according to FIG. 2 is the same as shown in FIG. 1 with the sole exception that the left support lever 12 is formed with teeth 24 on its lower terminal end, and a pinion gear 26 of a drive motor, which is attached to the vehicle, meshes with the teeth 24, so that the support levers 12 are pivotable by rotationally driving the pinion gear 26.

Figure 3:
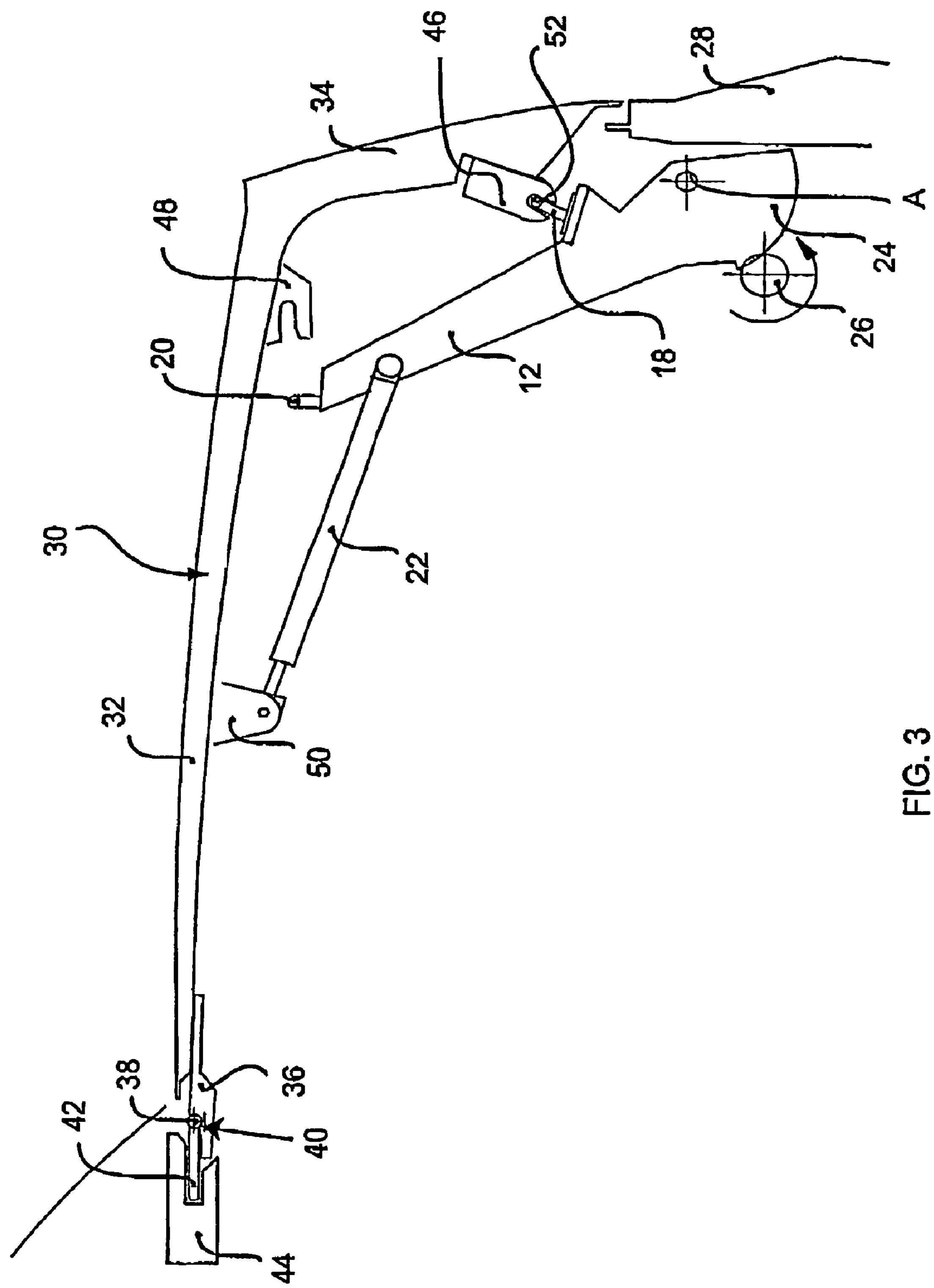
FIG. 3 a schematic, side-sectional view of the rear area of a vehicle with a side view of the inventive device when the rear trunk lid is closed.

FIG. 3 shows the assembly according to FIG. 2 installed in a vehicle. The shaft 16, which is not shown in FIG. 3, is supported, e.g., in the longitudinal supports of a vehicle in front of its tail gate 28, wherein the pivot axis A is located at a short distance in front of and underneath the loading edge formed by the upper side of the tail gate 28.

In the illustrated example, a rear trunk lid 30 of a vehicle, disposed in its closed position in FIG. 3, includes a flat upper wall 32 and a downwardly-bent rear wall 34.

The forward edge of the lower side of the upper wall 32 is extended by means of a water catch plate 36. The rotational axis 38 of a hinge 40 having a hinge plate 42 is located in the step and the hinge plate 42 is received in a rearward-opening slotted link 44 that is affixed to the vehicle.

A closing latch 46 is affixed to the inner side of the rear wall 34 near the lower edge area, which closing latch 46 is engaged with the closing bracket 18 of the support lever 12 in the illustrated state.

A forward-opening catch slotted link 48 is affixed to the lower side of the rear portion of the upper wall 32, which catch slotted link 48 is located rearward of the catch hook 20 of the support lever 12 in the illustrated state. The gas pressure damper 22 is attached to the support lever 12 underneath the catch hook 20 and the gas pressure damper 22 is attached to a bearing bracket 50 that is affixed approximately in the middle of the longitudinal extension of the upper wall 32, in the illustrated example.

In the illustrated rest position, the support lever 12 is oriented so as to be upwardly and forwardly inclined. It can be pivoted by means of the pinion gear 26 about the pivot axis A. As is evident from FIG. 1, a support lever 12 is advantageously provided on each side of the vehicle with the associated assembly and the pinion gear 26 belongs to a drive motor attached to the vehicle structure.

The function of the described assembly will be elucidated in the following:

According to FIG. 3, the support lever 12 will pivot about the pivot axis A in the clockwise direction upon rotation of the pinion gear 26 in the counter-clockwise direction. The closing bracket 18 will be moved thereby, which closing bracket 18 is advantageously disposed in front of and above the pivot axis A in the rest position of the support lever 18, so that the rear portion of the rear trunk lid 30 is slightly lifted and moved towards the rear. By further pivoting the support lever 12 (FIG. 4), the catch 20 arrives in the recess of the catch slotted link 48, so that the rear trunk lid 30 will initially move linearly toward the rear (FIG. 4) and then, due the kinematics of the engagement between the closing bracket 18 and the closing latch 46, which form a hinge having the axis 52, and the engagement of the catch hook 20 in the catch slotted link 48, the rear trunk lid 30 will be tilted upwardly, so that an intake opening 54 (FIG. 5) opens up in the front of the rear trunk lid; a foldable or rigid convertible roof can be moved though the intake opening 54 into the space defined underneath the closed rear trunk lid.

Figure 4:
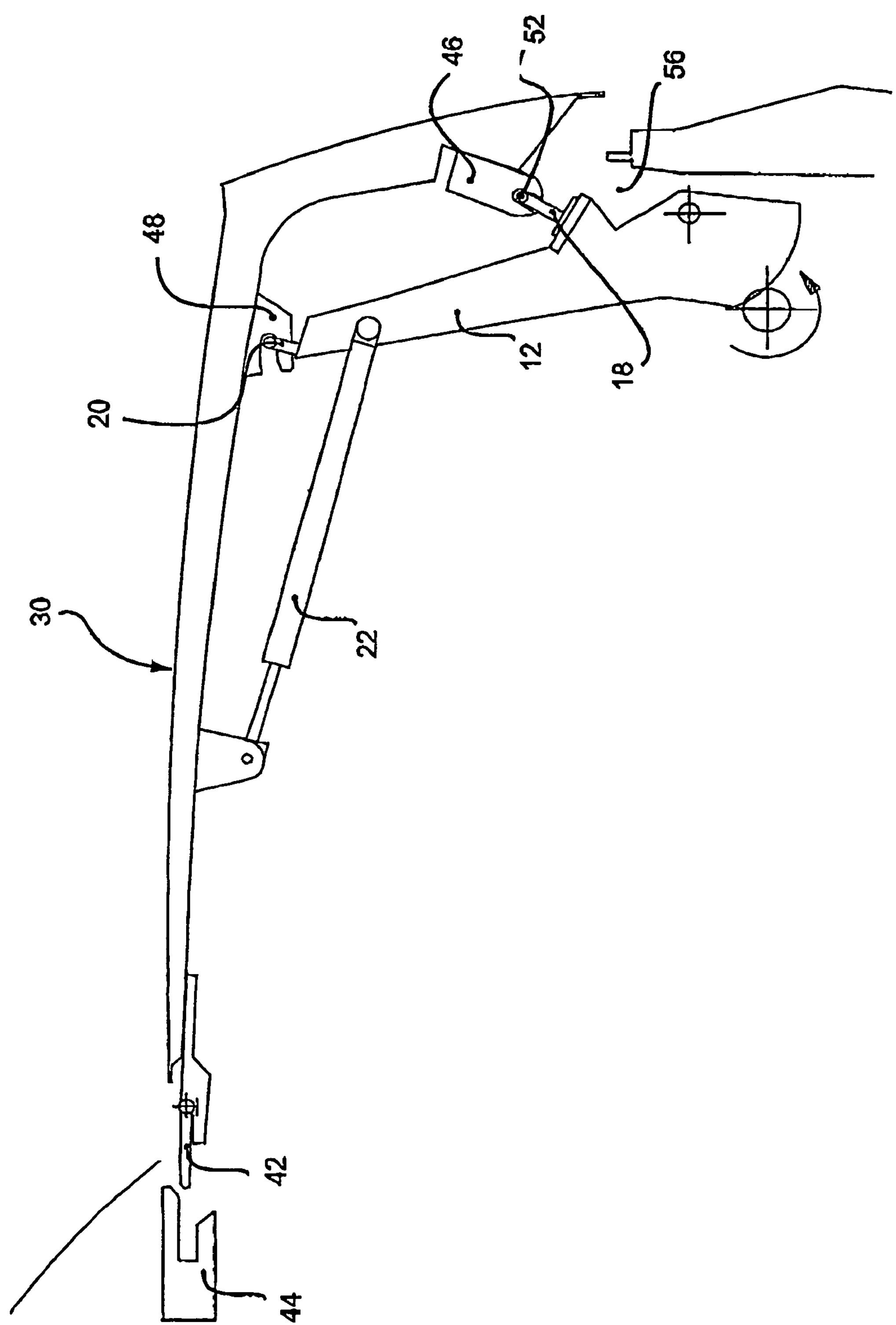
FIG. 4 a view similar to FIG. 2 at the beginning of the movement of the rear trunk lid into the intake position.

As is particularly evident in FIG. 4, the hinge plate 42 linearly moves out the slotted link 44 during the initial phase of the pivoting of the support lever 12, so that the rear trunk lid 30 is free to pivot in the clockwise direction. The gas pressure damper 22 ensures that the catch hook 20 remains in secure engagement with the catch slotted link 48, so that a closing latch is not required to be provided between these components.

Figure 5:
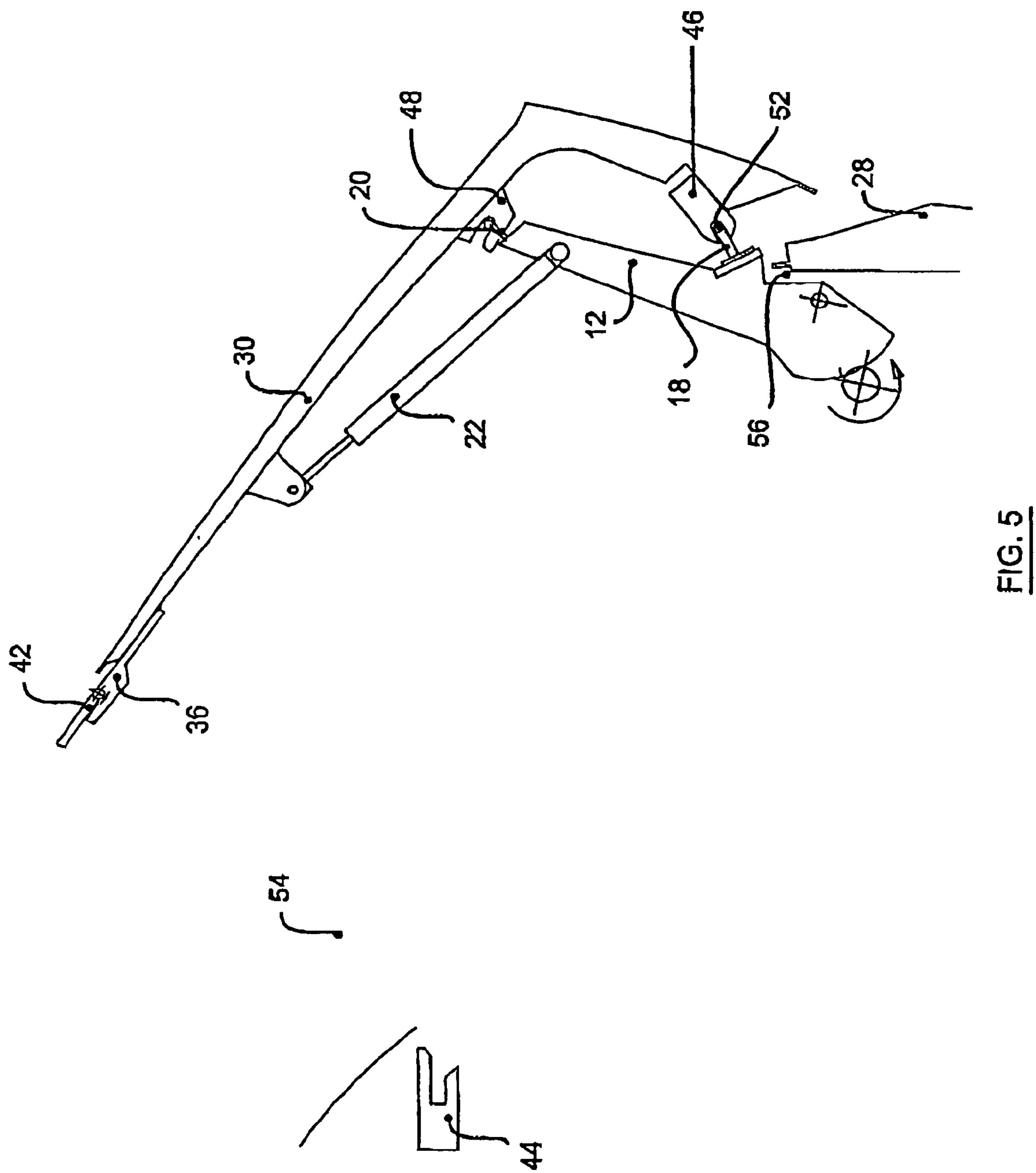
FIG. 5 a view similar to FIG. 2 with the rear trunk lid located in the intake position.

The engagement between the closing bracket 18 and the closing latch 46 is advantageously latched by the described pivoting of the rear trunk lid into its intake position, wherein this latching can occur electronically, so that it is assured that the rear trunk lid 30 remains in the position shown in FIG. 5 even if a force is applied to its forward edge.

As is evident from FIGS. 4 and 5, it is advantageous to form the support lever 12 with a recess 56 that receives the upper edge of the tail gate 28 when the support lever 12 is fully pivoted to the operational position shown in FIG. 5. In this case, the support lever 12 can be disposed as far rearward as possible, which is advantageous for the kinematics of the rear trunk lid movement into its intake position, in which the support lever 12 is rearwardly pivoted past its vertical position as shown in FIG. 5.

In order to move the rear trunk lid 30 from the intake position into the closed position, the described steps are performed in the reverse order, wherein it is assured, by supporting the hinge plate 42 on the water catch plate 36, that the hinge plate 42 is pushed into the slotted link 44 in a well-defined manner.

Figure 6:
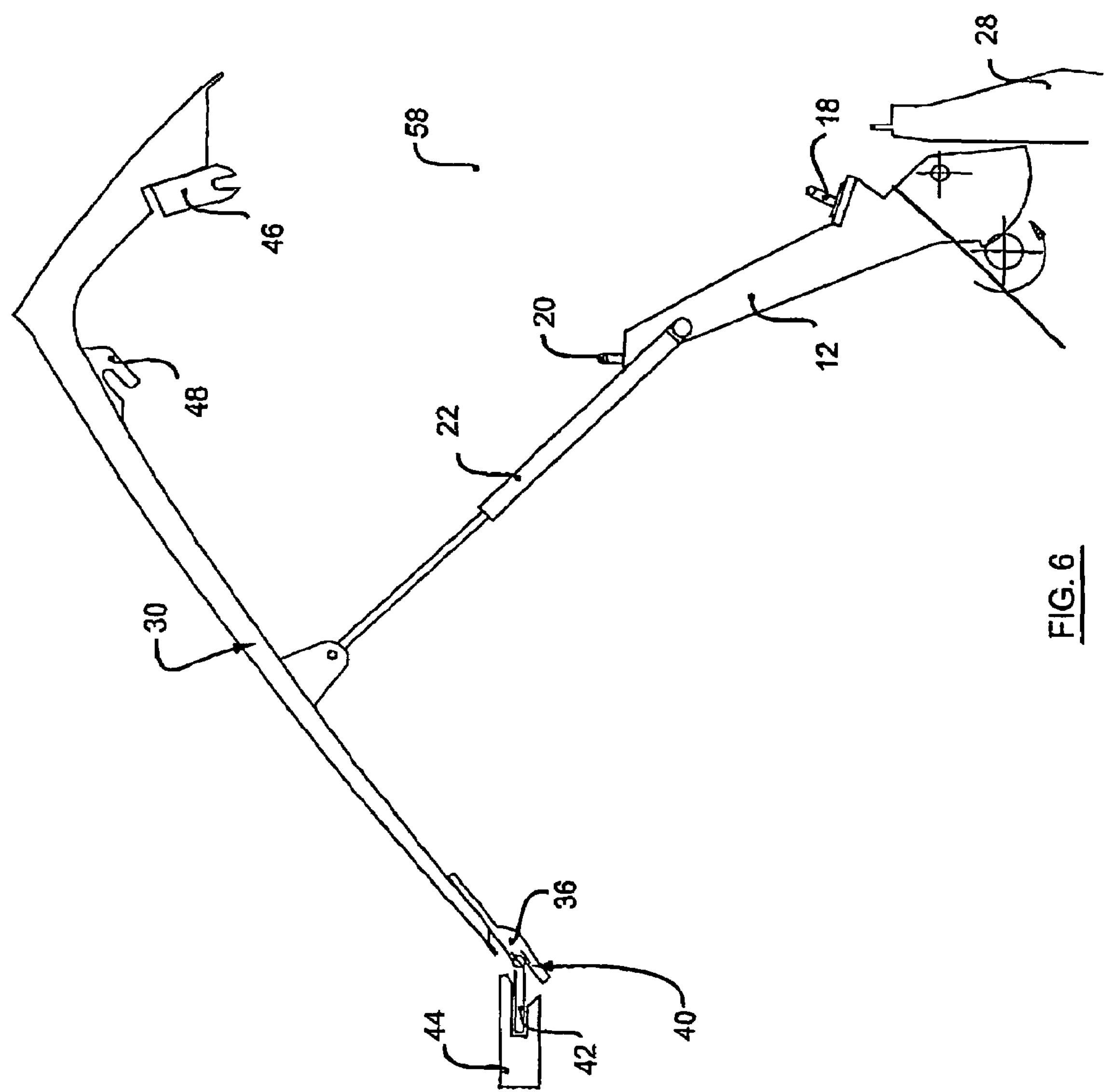
FIG. 6 a view similar to FIG. 2 with the rear trunk lid located in the loading position and FIG. 7 a view of an embodiment of the inventive device that has been modified as compared to FIG. 2.

FIG. 6 illustrates the assembly with the rear trunk lid 30 pivoted into the loading position, wherein a loading opening 58 is opened up. As evident, after releasing the engagement between the closing bracket 18 and the closing latch 46, the rear trunk lid 30 can be pivoted upwardly in the counter-clockwise direction about the pivot axis 38 of the hinge 40, whereby no pivoting of the support lever 12 is required and wherein the pivoting of the rear trunk lid 30 is assisted by the gas pressure damper 22.

As is particularly apparent by comparing FIGS. 3 and 6, the pivoting of the rear trunk lid 30 from the closed position into the loading position can be further assisted, in that the support lever 12 is pivoted in counter-clockwise direction (with a suitable design of its lower region, such that it does not abut the tail gate 28) until the joint between the gas pressure damper 22 and the support lever 12 is nearly straight.

The invention can be embodied and modified in many different ways.

Figure 7:
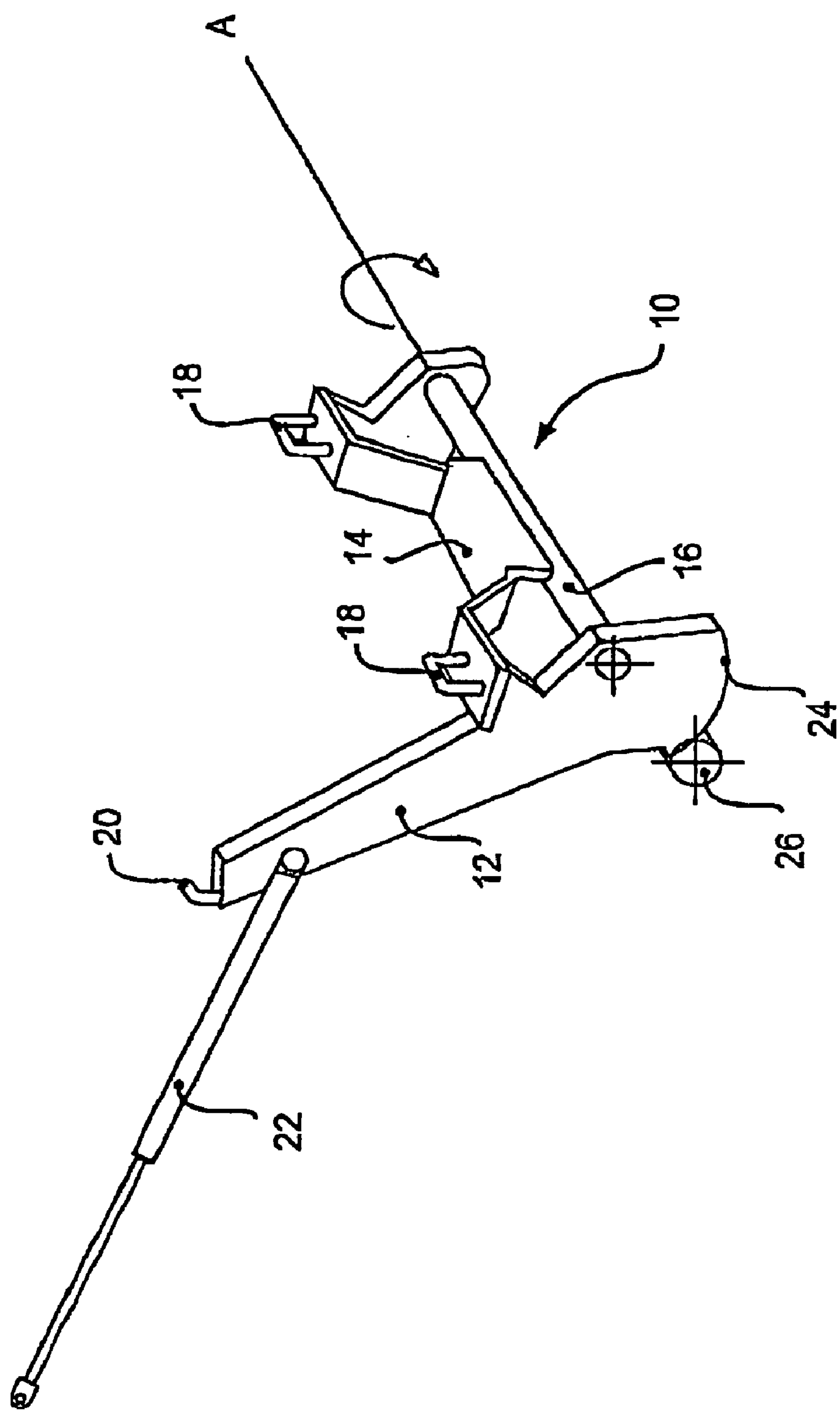

According to FIG. 7, which corresponds to the view of FIG. 2, a support lever 12 can be provided only on one vehicle-side for appropriately stiffer embodiments of the rear trunk lid.

The assembly of the support levers and bridge component, which form a stable frame, can be formed as a cast part. The two support levers are not required to be fixedly connected with each other so that they will rotate together. They can instead be supported and synchronously controlled by means of a suitable drive device. The latched connection between the support lever and the rear trunk lid can be achieved in any suitable way, so long as one latched connection between the two latching parts is provided. The latched connection between the components 18 and 46 can be the sole rear trunk lid latch, which can be mechanically, electrically or otherwise actuated. In that case, a separate latch between the rear trunk lid and the tail gate can be omitted. The gas pressure damper(s) 22 can be replaced by any other kind of elastic element that generates a biasing force over a sufficiently large range. In the alternative, a hydraulic cylinder can be used in place of the gas pressure damper(s), which hydraulic cylinder is passively damped and/or biased or is actively actuated.

The catch hook 20 can be formed on the rear trunk lid 30 and the catch slotted link 48 can be formed on the support lever 12.

The hinge 40 (or hinges) can be formed as a four-link hinge or another hinge with suitable kinematics.

The inventive rear trunk lid can be used not only for convertibles, but also for other purposes, in which the car trunk can be loaded alternatively from the front (through the intake opening 54) or from the rear (through the loading opening 58).

REFERENCE NUMBER LIST

- 10 Frame Assembly
- 12 Support Lever
- 14 Bridge Component
- 16 Shaft
- 18 Closing Bracket
- 20 Hook
- 22 Gas Pressure Damper
- 24 Teeth
- 26 Pinion Gear
- 28 Tail Gate
- 30 Rear Trunk Lid
- 32 Upper Wall
- 34 Rear Wall
- 36 Water Catch Plate
- 38 Pivot Axis
- 40 Hinge
- 42 Hinge Plate
- 44 Slotted Link
- 46 Closing Latch
- 48 Catch Slotted Link
- 50 Bearing Bracket
- 52 Hinge Axis
- 54 Intake Opening
- 56 Recess
- 58 Loading Opening

The invention claimed is:

1. A vehicle capable of selectively moving a rear trunk lid from a closed position into a forward-inclined intake position for opening up a substantially forward-facing intake opening, as well as from the closed position into a rearward-inclined loading position for opening up a substantially rearward-facing loading opening, the vehicle comprising:

a rear trunk lid having a forward edge that is, at least in its closed position, detachably connected with the vehicle body via at least one hinge defining a hinge axis, at least one support lever disposed on one vehicle side and underneath the rear trunk lid, which support lever is pivotable about a pivot axis that is stationary relative to the vehicle and extends in the traverse direction of the vehicle, which support lever is arranged and constructed to pivotably move the rear trunk lid from the closed position into the intake position and, in the intake position of the rear trunk lid, serves as the sole support for the rear trunk lid, wherein in the vicinity of a rear edge of the rear trunk lid, the rear trunk lid is, at least in its closed position, in detachable hinged connection with a portion of the support lever located above the pivot axis, and a first catch component provided on an upper end region of the support lever, the first catch component being arranged and constructed to detachably engage with a second catch component disposed on the rear trunk lid in a position that is rearward of the first catch component in the longitudinal direction of the vehicle when the rear trunk lid is in the closed position, wherein, when the hinged connection between the rear trunk lid and the support lever is released, the rear trunk lid is pivotable from its closed position into its loading position about the hinge axis, and the rear trunk lid is movable from its closed position into its intake position, in which the support lever is pivotable by maintaining the hinged connection in a position that the first and second catch components come into mutual engagement, and the connection of the rear trunk lid with the vehicle via the at least one hinge is first releasable by rearward movement of the rear trunk lid, and the rear trunk lid is then further pivotable by lifting the forward edge of the rear trunk lid.

2. A vehicle according to claim 1, wherein the detachable hinged connection between the support lever and the rear trunk lid is disposed, at least in its closed position, above and in front of the pivot axis of the support lever with respect to the longitudinal direction of the vehicle.

3. A vehicle according to claim 1, wherein the detachable hinged connection is formed as a latch.

4. A vehicle according to claim 1, further comprising at least one of a gas pressure damper and a hydraulic cylinder that is provided so as to extend in a forwardly-inclined manner from the support lever and engage the rear trunk lid.

5. A vehicle according to claim 1, further comprising a hinge plate disposed in the vicinity of the forward end of the rear trunk lid, so that, during the last phase of the pivoting of the support lever from the intake position into the closed position of the rear trunk lid, the hinge plate moves into a slotted link that is stationary relative to the vehicle.

6. A vehicle according to claim 1, further comprising a motor-driven pinion gear arranged and constructed to pivot the support lever, which pinion gear engages teeth formed on the support lever.

7. A vehicle according to claim 1, further comprising a hydraulic cylinder arranged and constructed to pivot the support lever.

8. A vehicle according to claim 1, wherein one support lever is arranged on each vehicle side and the support levers are rigidly connected with each other.

9. A vehicle according to claim 8, wherein the two, rigidly-connected support levers form a pre-assembled module that is installed in a bed in the rear of the vehicle.

10. A vehicle according to claim 1, wherein the detachable hinged connection is formed as a latch between the support lever and the rear trunk lid and is disposed, at least in its closed position, above and in front of the pivot axis of the support lever with respect to the longitudinal direction of the vehicle.

11. A vehicle according to claim 10, further comprising a hinge plate disposed in the vicinity of the forward end of the rear trunk lid, so that, during the last phase of the pivoting of the support lever from the intake position into the closed position of the rear trunk lid, the hinge plate moves into a slotted link that is stationary relative to the vehicle.

12. A vehicle according to claim 11, further comprising at least one of a gas pressure damper and a hydraulic cylinder that is provided so as to extend in a forwardly-inclined manner from the support lever and engage the rear trunk lid.

13. A vehicle according to claim 12, further comprising one of:

a motor-driven pinion gear arranged and constructed to pivot the support lever, which pinion gear engages teeth formed on the support lever, and a hydraulic cylinder arranged and constructed to pivot the support lever.

14. A vehicle according to claim 13, wherein one support lever is arranged on each vehicle side and the support levers are rigidly connected with each other.

15. A vehicle comprising:

a rear trunk lid comprising a first latch disposed on a downward-facing surface thereof, means for selectively moving the rear trunk lid from a closed position into a forward-inclined intake position for opening up a substantially forward-facing intake opening, as well as from the closed position into a rearward-inclined loading position for opening up a substantially rearward-facing loading opening, the selective moving means comprising a second latch arranged and constructed to releasably engage the first latch during at least a portion of the movement of the rear trunk lid between the closed position and the intake position, the second latch being disposed forward of the first latch, in the longitudinal direction of the vehicle, when the rear trunk lid is disposed in the closed position, a first detachable hinge provided between a forward edge of the rear trunk lid and a vehicle body, the first detachable hinge defining a hinge axis for pivoting the rear trunk lid between the closed position and the loading position and being releasable for movement of the rear trunk lid between the closed position and the intake position, a second detachable hinge provided between a rearward edge of the rear trunk lid and the vehicle body, the second detachable hinge and the first and second latches being arranged and constructed to support the rear trunk lid during movement between the closed position and the intake position and the second detachable hinge is releasable for movement of the rear trunk lid between the closed position and the loading position.

16. A vehicle as in claim 15, wherein the selective moving means comprises at least one support lever disposed on one vehicle side and underneath the rear trunk lid, wherein the at least one support lever is pivotable about a pivot axis that is stationary relative to the vehicle and extends in the traverse direction of the vehicle and the at least one support lever is arranged and constructed to serve as the sole support for the rear trunk lid when the rear trunk lid is disposed in the intake position.

17. A vehicle according to claim 16, wherein the selective moving means further comprises at least one of a gas pressure damper and a hydraulic cylinder that is provided so as to extend in a forwardly-inclined manner from the at least one support lever and engage the downward-facing surface of the rear trunk lid.

18. A vehicle according to claim 17, wherein the selective moving means further comprises one of:

a motor-driven pinion gear arranged and constructed to pivot the at least one support lever, which pinion gear engages teeth formed on the at least one support lever, and a hydraulic cylinder arranged and constructed to pivot the at least one support lever.

19. A vehicle according to claim 15, wherein the first hinge comprises:

a hinge plate disposed in the vicinity of the forward end of the rear trunk lid, and a slotted link that is stationary relative to the vehicle, the hinge plate and slotted link being arranged and constructed such that, during the last phase of moving the rear trunk lid from the intake position into the closed position of the rear trunk lid, the hinge plate substantially linearly slides into the slotted link.

* * * * *